(12) United States Patent
Duparre et al.

(10) Patent No.: US 7,864,457 B2
(45) Date of Patent: Jan. 4, 2011

(54) ACHROMATIC LENS STRUCTURE, METHOD OF FABRICATION, AND IMAGING DEVICES AND SYSTEMS USING THE SAME

(75) Inventors: Jacques Duparre, Jena (DE); Steven D. Oliver, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 58 days.

(21) Appl. No.: 12/431,519

(22) Filed: Apr. 28, 2009

(65) Prior Publication Data

US 2010/0271714 A1  Oct. 28, 2010

(51) Int. Cl.
*G02B 9/00* (2006.01)
*H01L 31/0232* (2006.01)
(52) U.S. Cl. .................. 359/797; 359/796; 257/432
(58) Field of Classification Search .......... 257/431, 257/432, E33.073; 359/733, 742, 784, 796, 359/797; 438/29, 31
See application file for complete search history.

(56) References Cited

U.S. PATENT DOCUMENTS

| | | | |
|---|---|---|---|
| 7,352,511 B2 | 4/2008 | Boettiger et al. | |
| 7,688,531 B1* | 3/2010 | Deng et al. | 359/811 |
| 7,710,667 B2* | 5/2010 | Oliver et al. | 359/776 |
| 7,773,317 B2* | 8/2010 | Duparre | 359/793 |
| 2005/0254400 A1 | 11/2005 | Nishikawa | |
| 2008/0130129 A1 | 6/2008 | Boden et al. | |
| 2008/0252964 A1 | 10/2008 | Koenig | |
| 2008/0290435 A1 | 11/2008 | Oliver et al. | |
| 2010/0091386 A1* | 4/2010 | Deng et al. | 359/773 |

FOREIGN PATENT DOCUMENTS

CN  100345022  10/2007

* cited by examiner

*Primary Examiner*—David N Spector
(74) *Attorney, Agent, or Firm*—Dickstein Shapiro LLP (57) ABSTRACT

Lens structures, imaging devices, and methods of making the same that include a lens and a transparent material having different dispersions and used to correct chromatic and spherical aberrations. The transparent material may be a curable polymer used to join the lens to other elements of the lens structure.

35 Claims, 13 Drawing Sheets

ACHROMATIC LENS STRUCTURE, METHOD OF FABRICATION, AND IMAGING DEVICES AND SYSTEMS USING THE SAME

FIELD OF THE INVENTION

Embodiments of the invention relate generally to imaging devices, and more particularly, to using a complex lens to correct chromatic and spherical aberration.

BACKGROUND

Solid state imaging devices, e.g., CCD, CMOS, and others, may include a lens or a lens structure to direct incoming light onto a focal plane array of pixels. Each one of the pixels includes a photosensor, for example, a photogate, photoconductor, or photodiode, overlying a substrate for accumulating photo-generated charge in an underlying portion of the substrate. The charge generated by the pixels in the pixel array is then read out and processed to form an image. Often the lens or lens structure is part of a wafer level fabrication and imager module assembly process.

Figure 1:
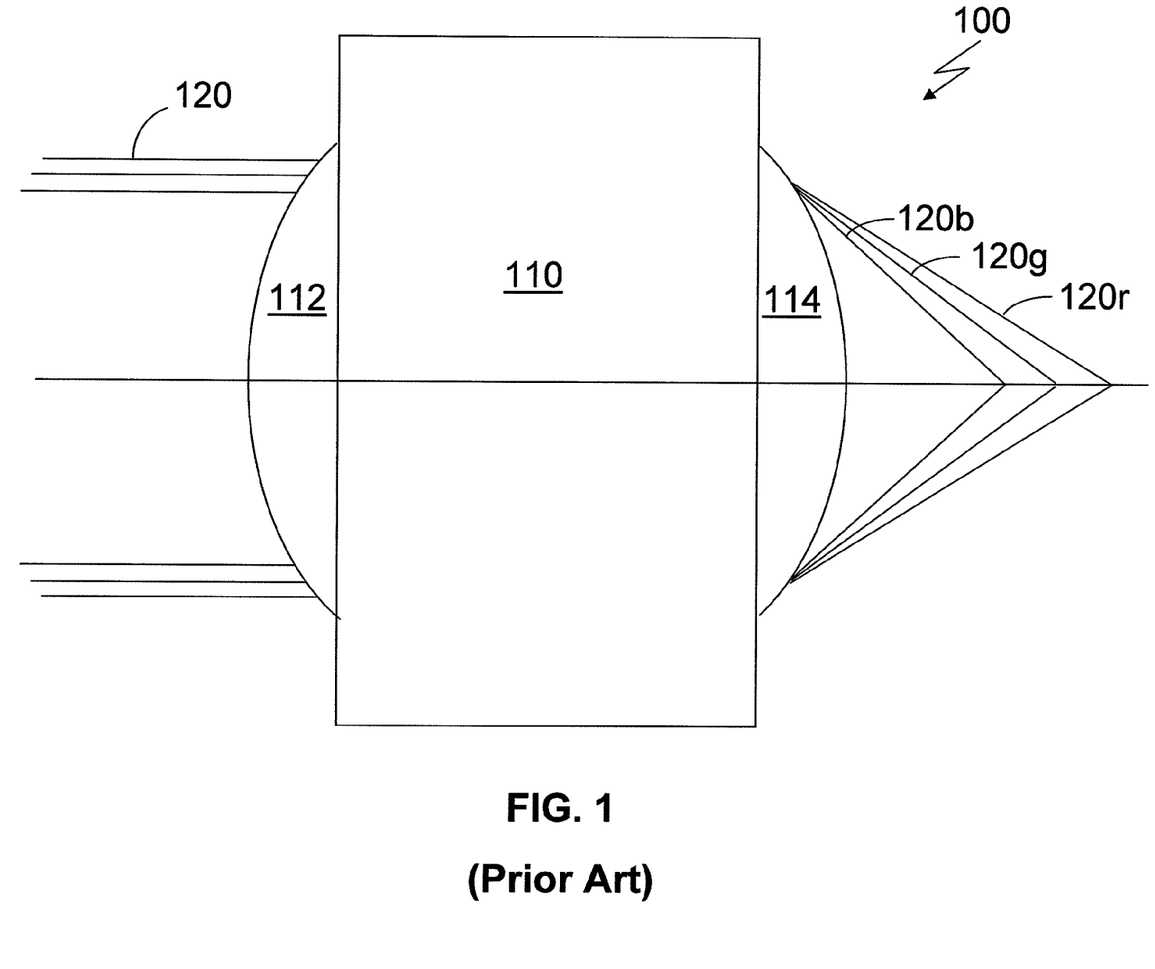
FIG. 1 shows a lens structure.

FIG. 1 is a diagram of a lens structure 100 that includes a first convex lens 112 and a second convex lens 114 arranged on opposite sides of a substrate 110 to form a double sided convex lens structure known as "biconvex". Light rays 120 passing through the lens structure 100 are subject to lateral chromatic aberration. Chromatic aberration is caused by a lens having a different refractive index for different wavelengths of light, known as the dispersion of the lens. Since the focal length of a lens is dependent on the refractive index of the lens material, different wavelengths of light will be focused at different positions. Therefore, red 120r, green 120g, and blue 120b components of the light rays 120 are focused at different distances from the lens structure 100, which can result in a blurry image. Chromatic aberration of a lens may manifest as fringes of color around an image, because each color in the optical spectrum cannot be focused at a single common point on the optical axis.

A conventional lens structure 100 having spherical lenses 112, 114 may also produce spherical aberration. Spherical aberration is an image imperfection that occurs due to the increased refraction of light rays 120 when the light rays 120 strike a lens 112, 114 near its edge, in comparison with light rays 120 that strike nearer the center of the lens 112, 114. A positive spherical aberration occurs when peripheral rays are bent too much and a negative spherical aberration occurs when peripheral rays are not bent enough.

What is needed is a system and method by which spherical and chromatic aberrations may be corrected in a lens, including one which can be fabricated at a wafer level.

DETAILED DESCRIPTION

In the following detailed description, reference is made to the accompanying drawings which form a part hereof, and in which are shown by way of illustration specific embodiments that may be practiced. These embodiments are described in sufficient detail to enable those of ordinary skill in the art to make and use them, and it is to be understood that structural, logical, or procedural changes may be made to the specific embodiments disclosed herein.

Embodiments of lenses described herein are useful for correcting spherical and chromatic aberrations and include a lens structure, which may be fabricated at a wafer level, and which have a lens coupled to a transparent material having a dispersion different from that of the lens. The transparent material may also be used to bond components of the lens structure, such as substrates and lenses, to each other. In one or more embodiments, the substrates and/or lenses may be bonded together over their entire surface without an air gap. The lens structure thus provides an additional optical active interface, which is used to control chromatic and spherical aberrations.

Figure 2:
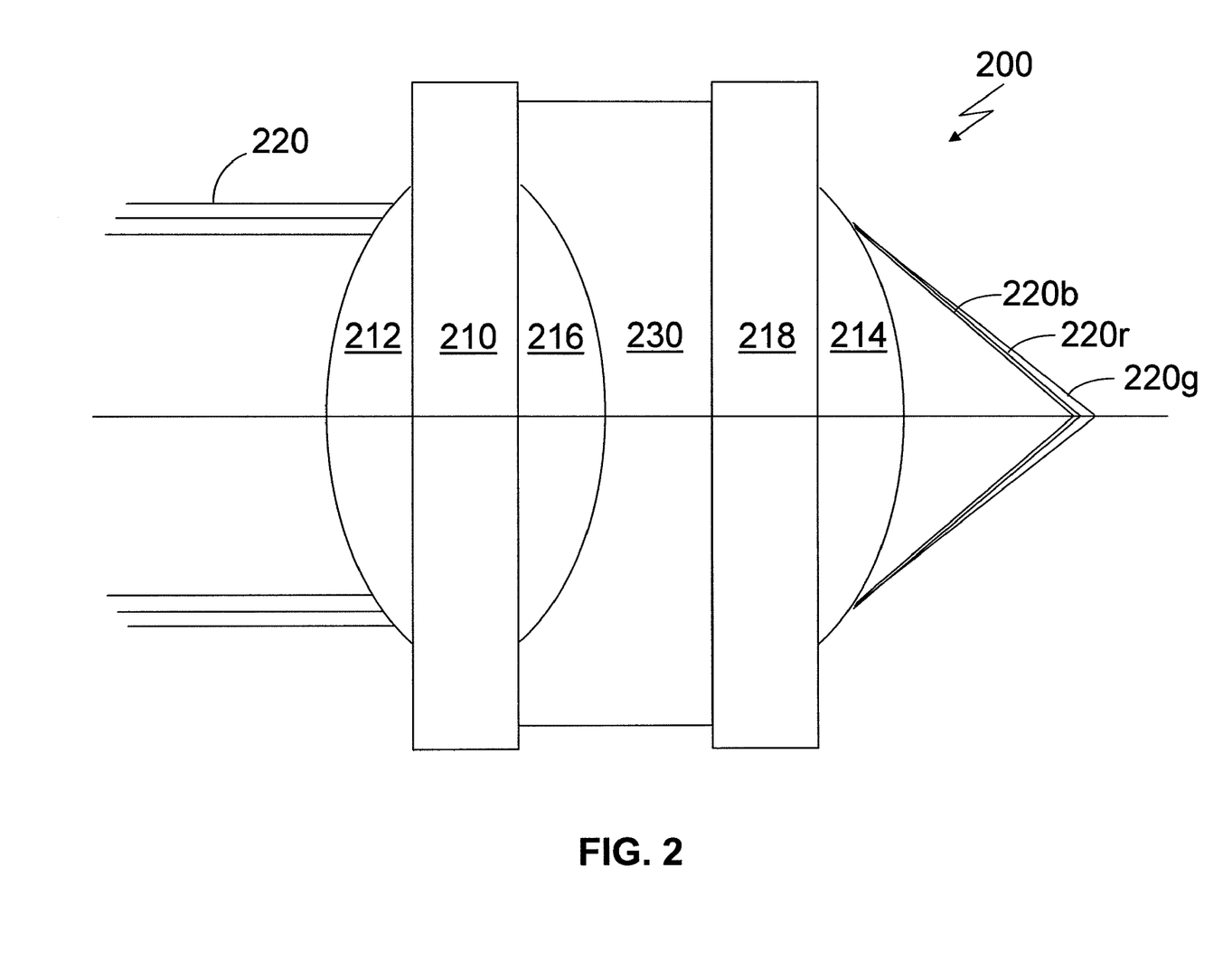
FIG. 2 shows a lens structure according to an embodiment described herein.

FIG. 2 is a diagram of a lens structure 200, which may be fabricated with other like lens structures on a wafer level, having first 212, second 214, and third 216 convex lenses. The first convex lens 212 and third convex lens 216 are arranged on opposite sides of a first substrate 210, and the second convex lens 214 is arranged on a second substrate 218. In various embodiments, the lenses 212, 214, 216 may be formed integrally with the substrates 210, 218. A transparent material 230 is arranged between the first substrate 210 and the second substrate 218 and between the third lens 216 and the second substrate 218. In one embodiment, the transparent material 230 may be a polymer that bonds or otherwise joins the first substrate 210 and second substrate 218. FIG. 2 also illustrates light rays 220 having red 220r, green 220g, and blue 220b components.

The transparent material 230 has a dispersion, (inverse to the Abbe number), and a refractive index that is different, i.e., either higher or lower, from that of the third lens 216 to correct for chromatic aberration. In one embodiment, the transparent material 230 has a dispersion that is higher than that of the third lens 216. As the difference of dispersion (and refractive index) between the third lens 216 and the transparent material 230 is made larger, the lens "sag" may be made smaller. As shown in FIG. 2, achromatization of the minimum component 220r (red) and maximum component 220b (blue) wavelengths is achieved by causing the wavelengths to overlap, while a secondary spectrum is still visible for the middle component 220g (green). The secondary spectrum may be corrected as well by using an anomalous dispersion in either the transparent material 230 or the third lens 216.

The lens structure 200 also reduces spherical aberration through use of spherical lenses 212, 214, 216. In another embodiment, one or more of the lenses 212, 214, 216 may have aspherical lens profiles to further reduce the spherical aberration and improve the field performance of the lens structure 200. In yet another embodiment, several lenses 216 and transparent material 230 layers may be joined sequentially together to improve the lens structure 200 performance over a larger field of view. In another embodiment, several lens structures 200 may be joined together with air spaces separating the lens structures 200.

In one embodiment, the material used to form the first 212, second 214, and third 216 lenses may be an ultra-violet curable polymer. One example of such an ultraviolet-curable polymer is Ormocomp® from Micro Resist Technology. The substrates 210, 218 may be made out of materials such as glass or polymer. The transparent material 230 may be selected based on the material used to form the third lens 216 so that the transparent material 230 has a different dispersion from the third lens 216. In various embodiments, the transparent material may be TU-7048 or TT8021 from JSR Corporation, Adhesives N61, N63, and N68 from Norland Products, Inc., Vitralit® from Panacol-Elosol GmbH, OPA-20632 from Dymax Corporation, Adhesive 3471-2-136 from DSM Desotech, Inc., Zipcone UA from Gelest, Inc., Adhesive OG134 by Epo-Tek, or Ormocers, e.g., Ormocomp or Ormocore from Micro Resist Technology, GmbH.

Figure 3:
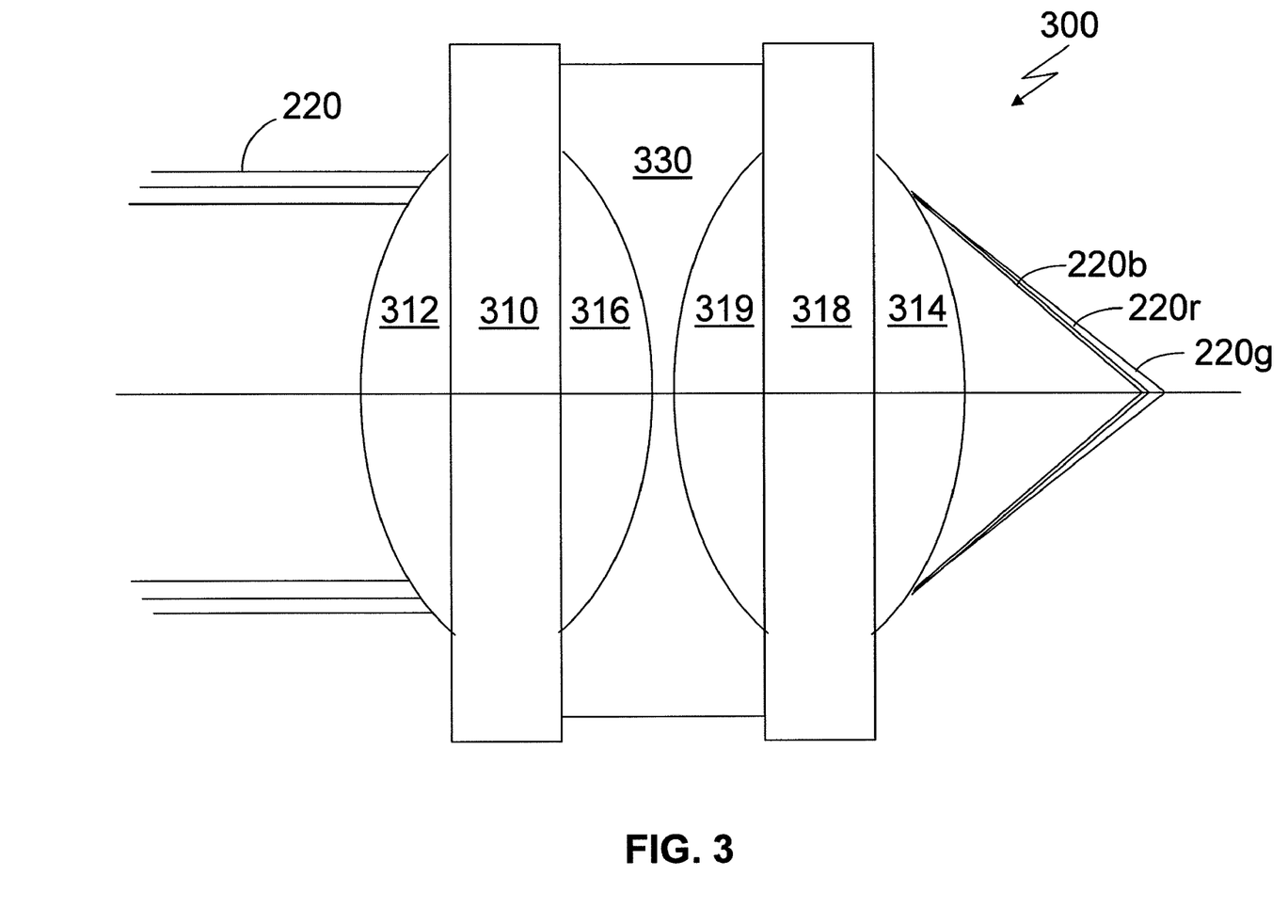
FIG. 3 shows a lens structure according to another embodiment described herein.

FIG. 3 is a diagram of a lens structure 300 having first 312, second 314, third 316, and fourth 319 convex lenses. The first convex lens 312 and third convex lens 316 are arranged on opposite sides of a first substrate 310, and the second convex lens 314 and fourth convex lens 319 are arranged on opposite sides of a second substrate 318. A transparent material 330 is arranged between the first substrate 310 and the second substrate 318 and between the third lens 316 and the fourth lens 319. The transparent material 330 has a dispersion and refractive index that is different, i.e., either higher or lower, from that of the third lens 316 and the fourth lens 319 to correct for chromatic and spherical aberrations.

Figure 4:
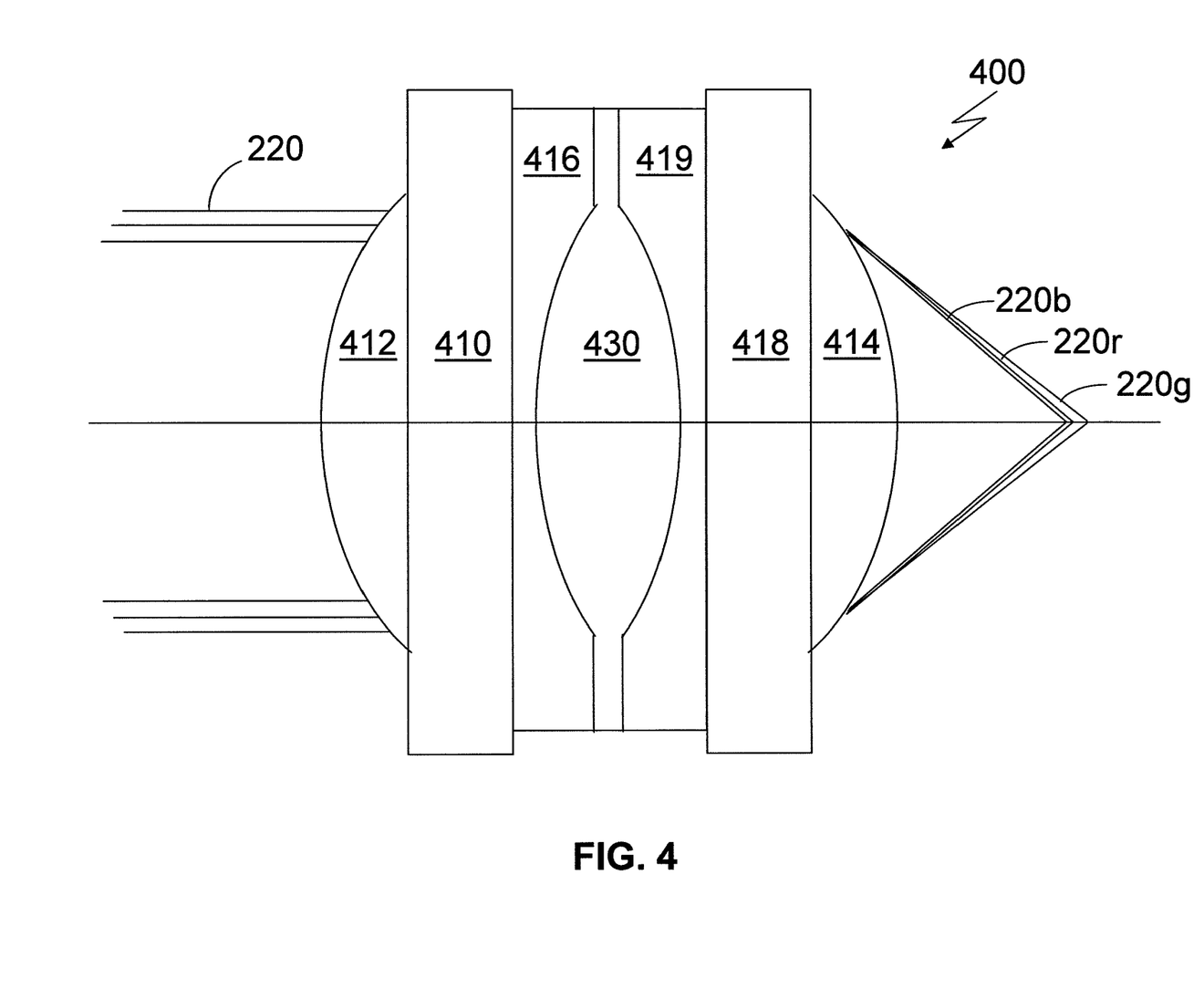
FIG. 4 shows a lens structure according to another embodiment described herein.

FIG. 4 is a diagram of a lens structure 400 having first 412 and second 414 convex lenses and first 416 and second 419 concave lenses. The first convex lens 412 is arranged on a first substrate 410, and the second convex lens 414 is arranged on a second substrate 418. The first concave lens 416 is arranged on the first substrate 410, opposite to the first convex lens 412. The second concave lens 419 is arranged on the second substrate 418 opposite to the second convex lens 414. a transparent material 430 is arranged between the first 416 and second 419 concave lenses. The transparent material 430 has a dispersion and refractive index that is different, i.e., either higher or lower, from that of the first 416 and second 419 concave lenses to correct for chromatic and spherical aberrations. In one embodiment, the transparent material 430 has a dispersion that is lower than the dispersions of the first 416 and second 419 concave lenses.

Figure 5:
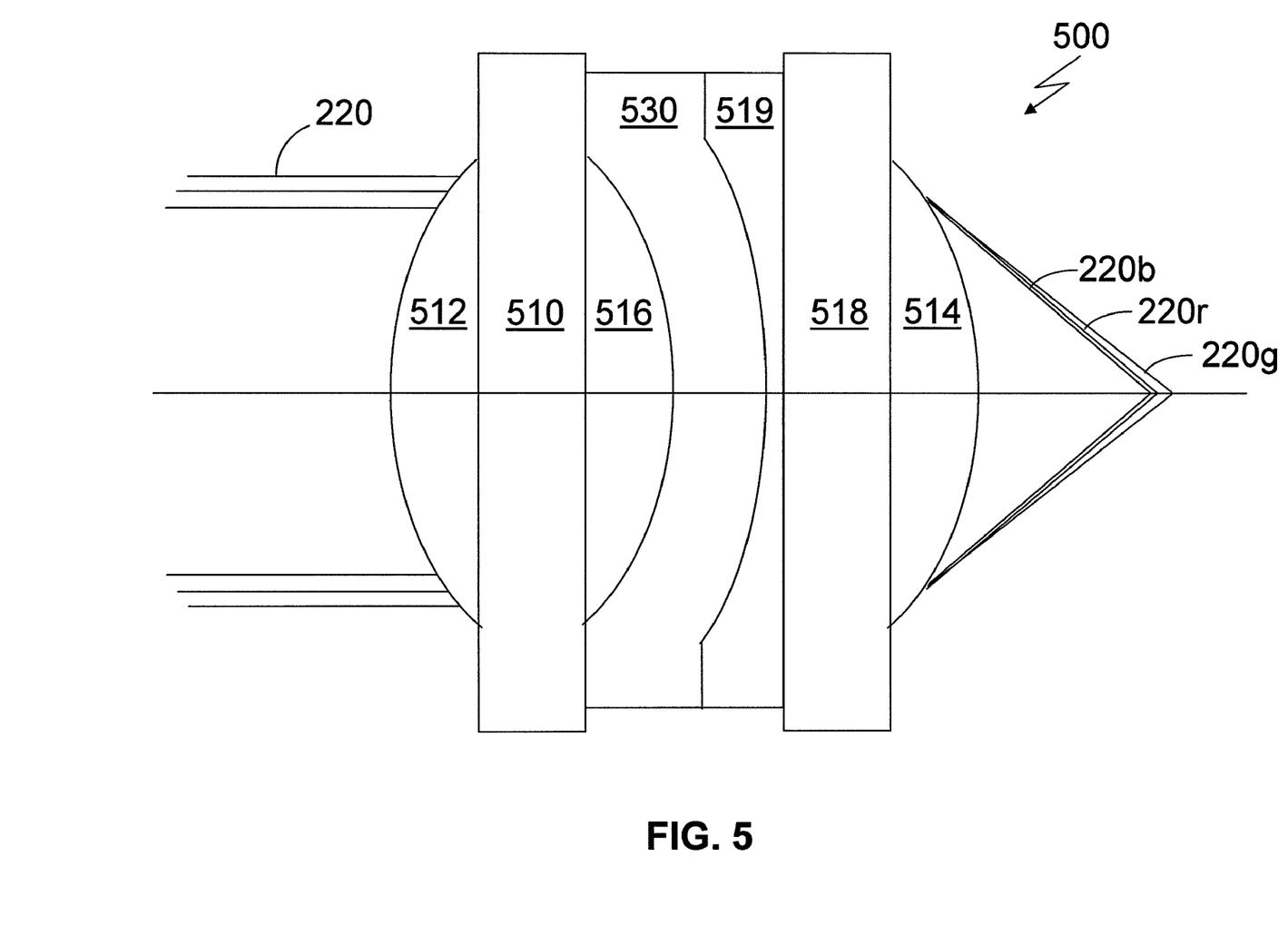
FIG. 5 shows a lens structure according to another embodiment described herein.

FIG. 5 is a diagram of a lens structure 500 having first 512, second 514, and third 516 convex lenses and a concave lens 519. The first convex lens 512 and third convex lens 516 are arranged on opposite sides of a first substrate 510, and the second convex lens 514 and concave lens 519 are arranged on a second substrate 518. A transparent material 530 is arranged between the first substrate 510 and the second substrate 518 and between the third lens 516 and the concave lens 519. The transparent material 530 has a dispersion and refractive index that is different, i.e., either higher or lower, from that of the third lens 516 and the concave lens 519 to correct for chromatic and spherical aberrations.

Figure 6:
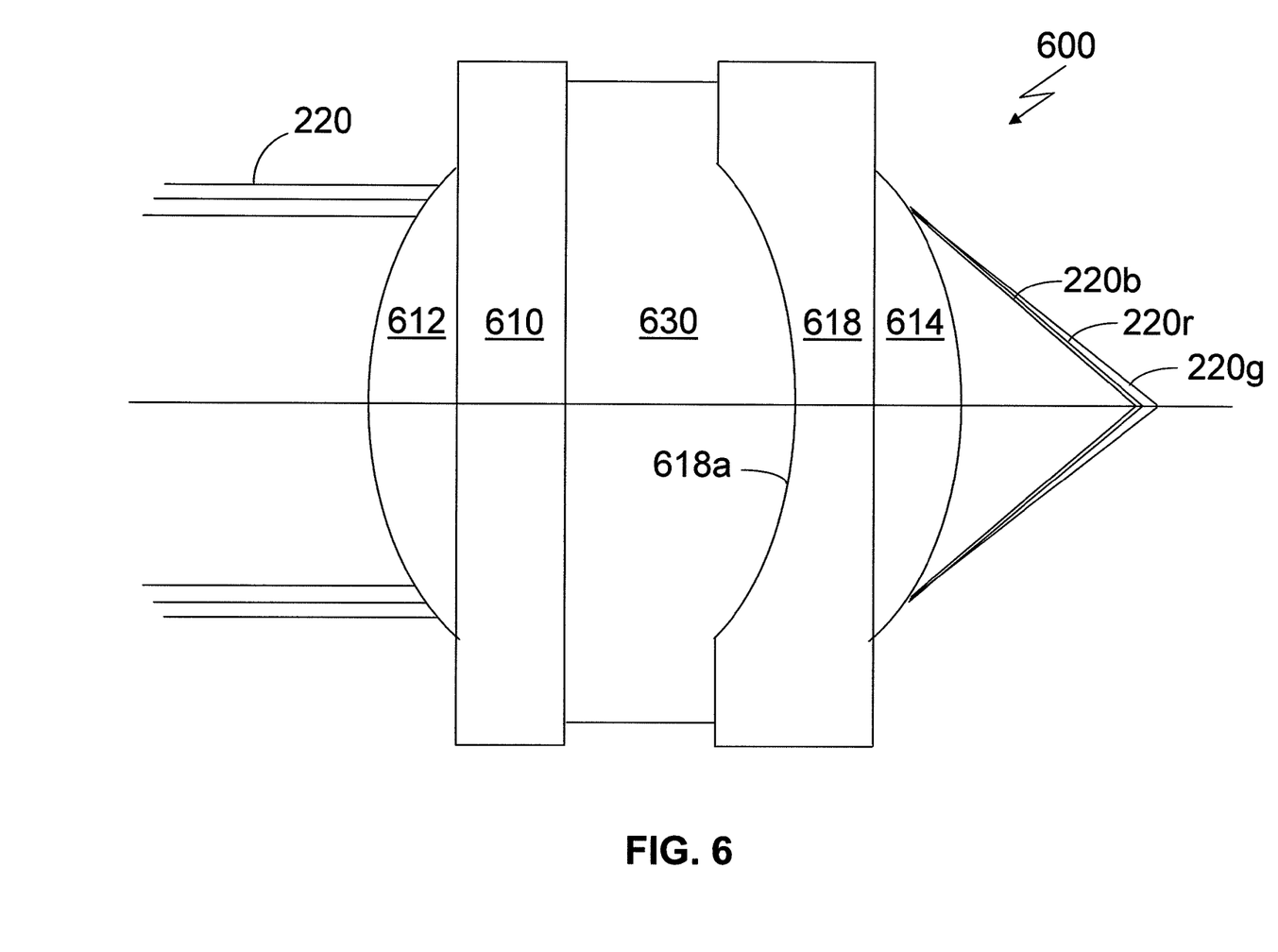
FIG. 6 shows a lens structure according to another embodiment described herein.

FIG. 6 is a diagram of a lens structure 600 having a first convex lens 612 arranged on a first substrate 610, and a second convex lens 614 arranged on a second substrate 618. A transparent material 630 is arranged between the first substrate 610 and the second substrate 618. One side 618a of the second substrate 618 is concave and thus forms a concave lens. The second substrate 618 is formed of a material that has a higher dispersion, and therefore lower Abbe number, than the transparent material 630, for example SF6 glass or polycarbonate to correct for chromatic aberration. In another embodiment, the side 618a of the second substrate 618 could be formed into a concave lens.

Figure 7:
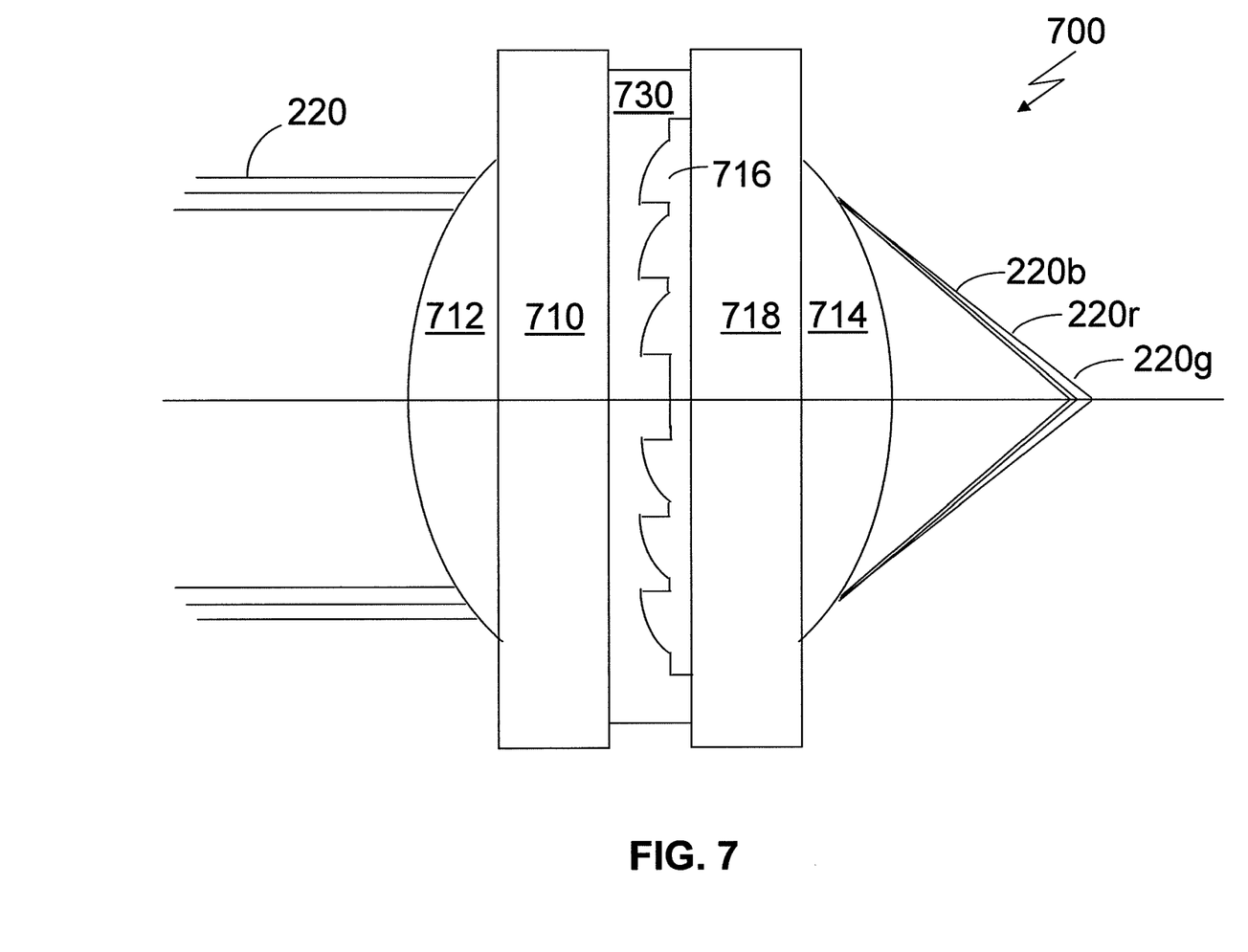
FIG. 7 shows a lens structure according to another embodiment described herein.

FIG. 7 is a diagram of a lens structure 700 having a first convex lens 712 arranged on a first substrate 710, and a second convex lens 714 and a third lens 716 arranged on a second substrate 718. The third lens 716 is a diffractive or Fresnel lens. A transparent material 730 is arranged between the first substrate 710, the second substrate 718, and the third lens 716. In the lens structure 700 of this embodiment, the dispersion of the material used in the third lens 716 may be the same or different as the dispersion of the transparent material 730 so long as the index of refraction of the third lens 716 and the transparent material 730 is different. In another embodiment, the profile of the third lens 716 may be formed from the second substrate 718 itself.

Figure 8A:
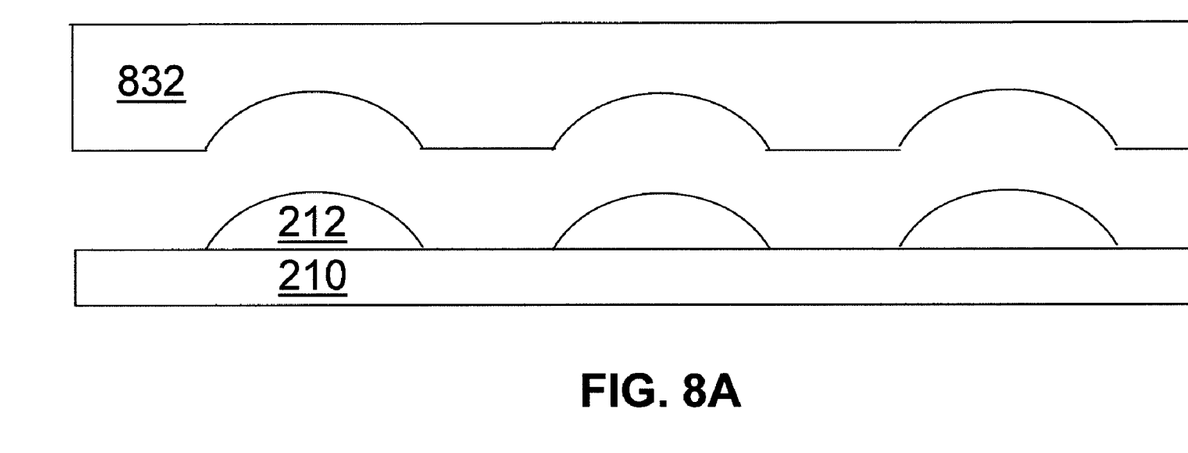
FIGS. 8A-8G show a lens structure in various stages of manufacture according to an embodiment described herein.

A method of making the lens structure 200 in the embodiment shown in FIG. 2 at a wafer level is now described. As shown in FIG. 8A, a first lens stamp 832 created from an original master may be used to form the first convex lenses 212 on the first substrate 210 using a UV (ultra-violet) replication method. Although only three first lenses 212 are shown in FIG. 8A, it should be understood that tens, hundreds, or thousands of lens structures may be formed at the same time by this method.

Figure 8B:
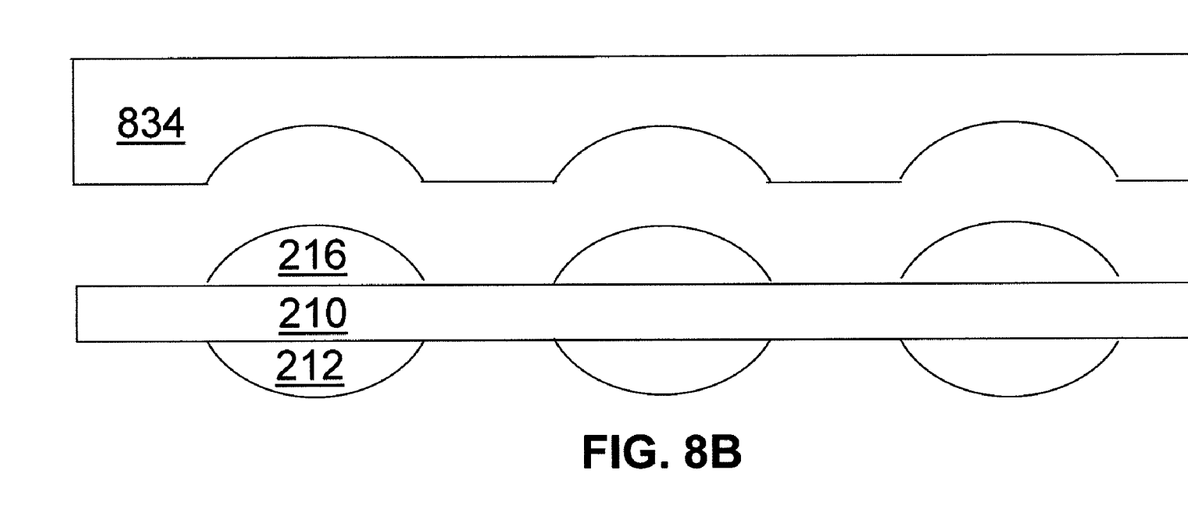
Figure 8C:
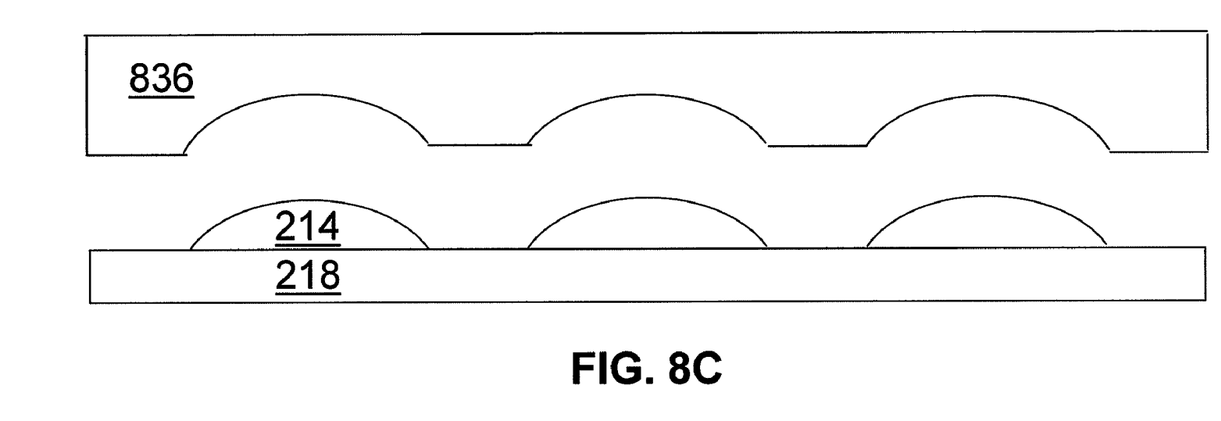

As shown in FIG. 8B, second convex lenses 216 may be formed on the opposite side of the first substrate 210 using a second lens stamp 834 via a UV replication method. As shown in FIG. 8C, third convex lenses 214 are formed on the second substrate 218 using a third lens stamp 836 via a UV replication method. In various embodiments, the first 832, second 834, and third 836 lens stamps may be the same or different stamps depending on whether the lens profiles of the first 212, second 216, and third 214 lenses have the same or different profiles. The lenses 212, 214, 216 may be optionally bonded to their respective substrates 210, 218 by an adhesive agent, such as Hexamethyldisilazane (HMDS).

Figure 8D:
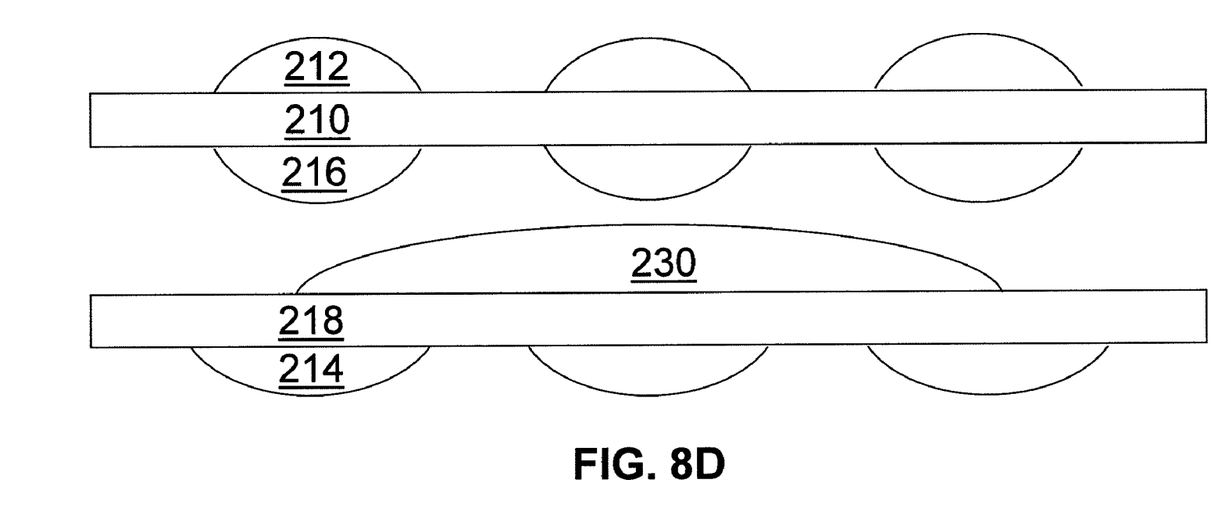
Figures 8E, 8F:
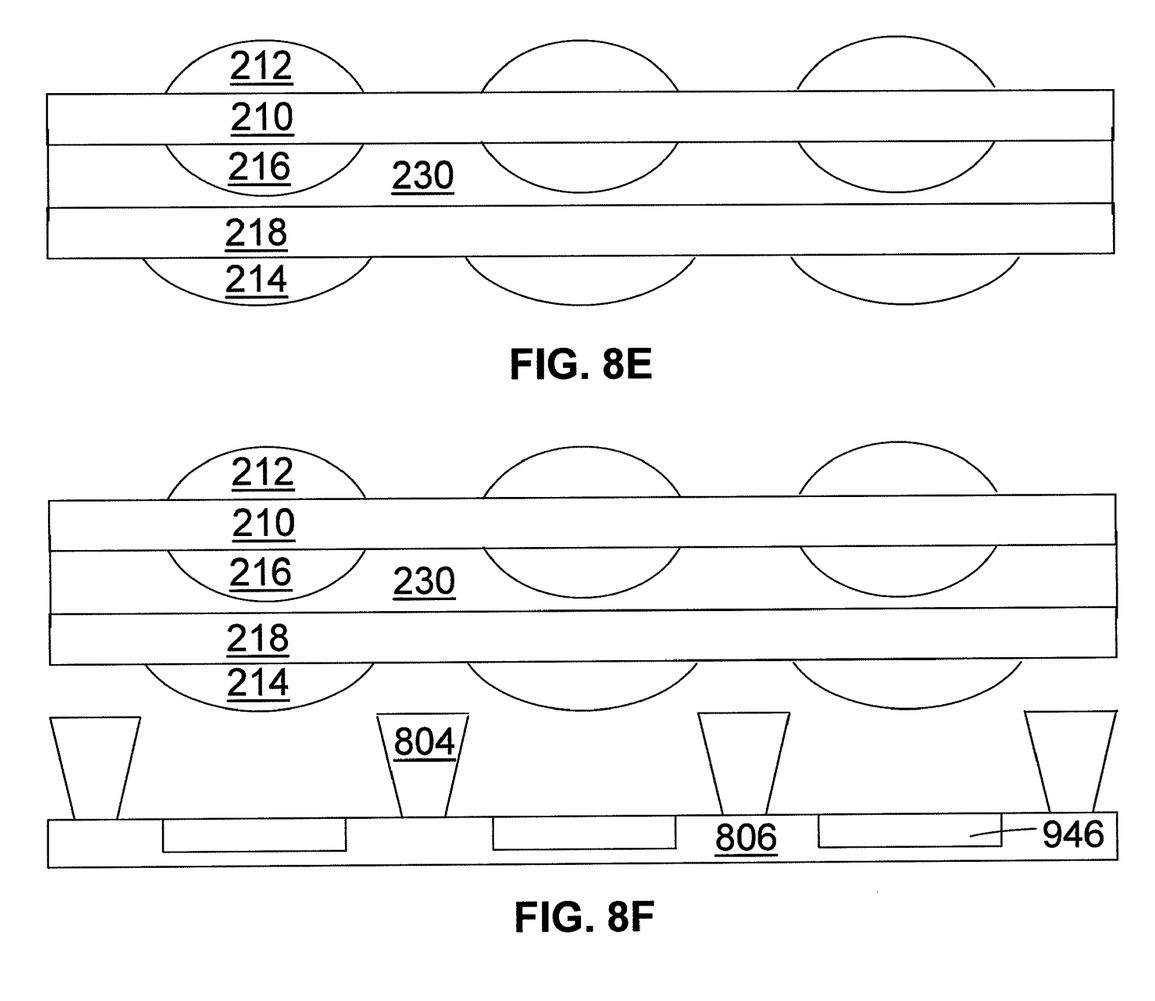

As shown in FIG. 8D, the transparent material 230 is applied to the second substrate 218 on the side opposite the third lenses 214. In another embodiment, the transparent material could be applied to the first substrate 210 and second lenses 216. As shown in FIG. 8E, the first substrate 210 and the second substrate 218 are aligned and joined together via transparent material 230 and then the transparent material 230 is cured to bond the substrates 210, 218 and lenses 216 together.

Figure 8G:
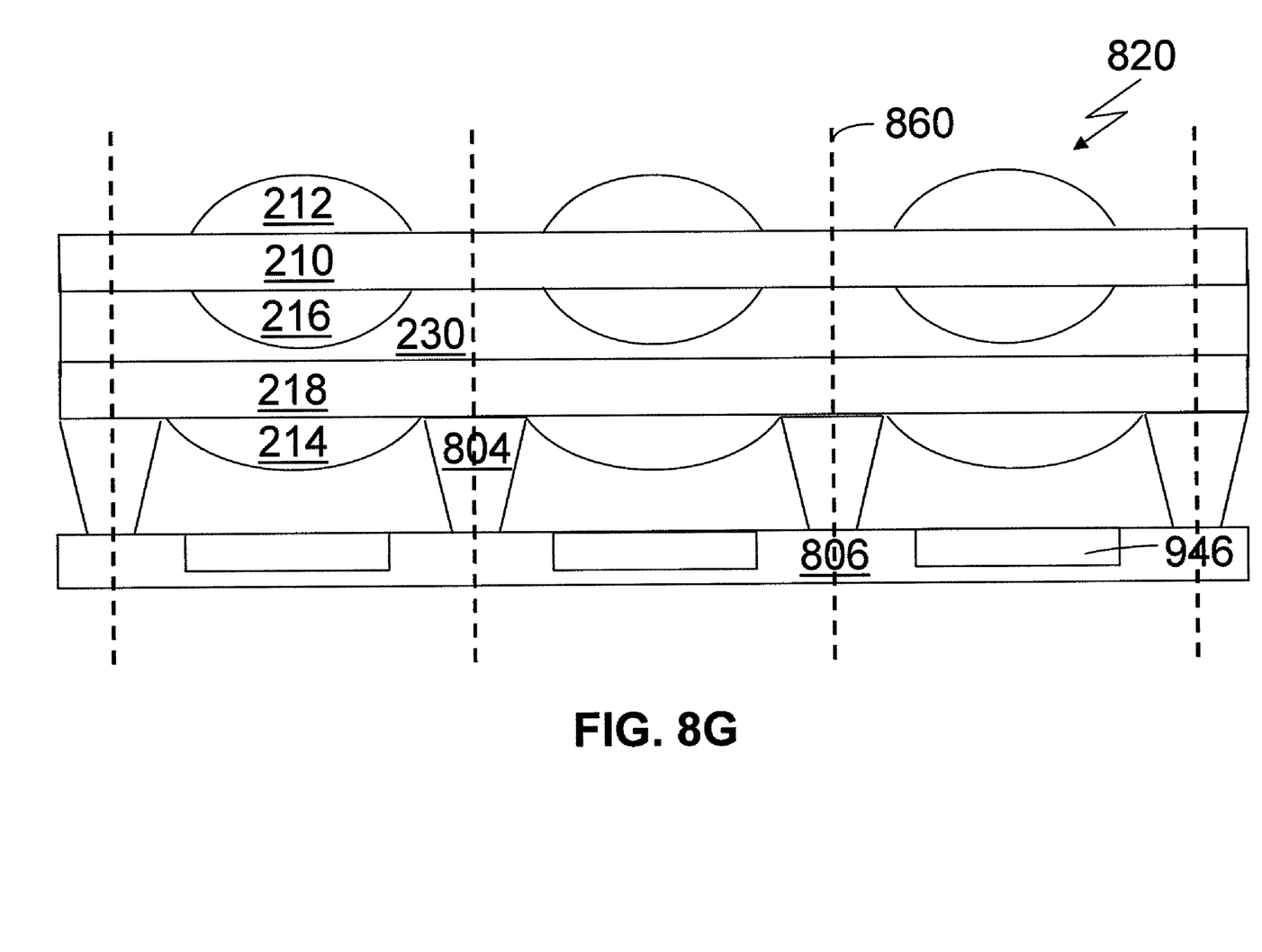

As shown in FIG. 8F, the substrates 210, 218 are aligned and joined to a plurality of spacers 804 on a wafer 806 containing a plurality of pixel arrays 946. As shown in FIG. 8G, the completed stack may be diced along the dashed lines 860 by any method to separate and complete the imaging device 820. Alternatively, only the stack of lenses and spacer wafers are separated and individually placed on image sensors. A similar method can be used to form imaging devices that include lens structures 300, 400, 500, 600, and 700.

Figure 9:
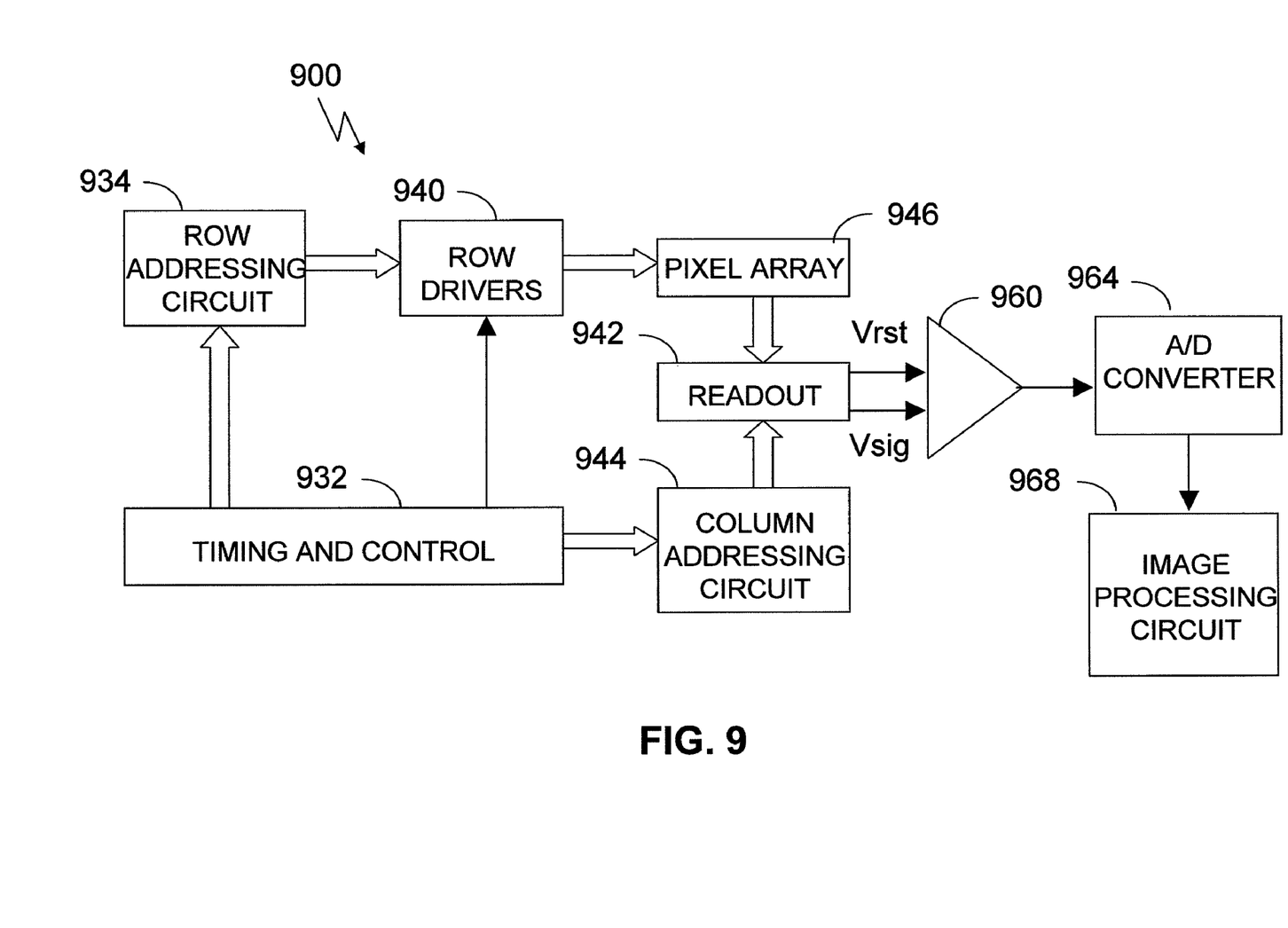
FIG. 9 illustrates a block diagram of a CMOS imaging device constructed in accordance with an embodiment described herein.

FIG. 9 shows a block diagram of an imaging device 900, e.g. a CMOS imager, that may be used in conjunction with one of the lens structures 200, 300, 400, 500, 600, 700 according to embodiments described herein. A timing and control circuit 932 provides timing and control signals for enabling the reading out of signals from pixels of the pixel array 946 in a manner commonly known to those skilled in the art. The pixel array 946 has dimensions of M rows by N columns of pixels, with the size of the pixel array 946 depending on a particular application.

Signals from the imaging device 900 are typically read out a row at a time using a column parallel readout architecture. The timing and control circuit 932 selects a particular row of pixels in the pixel array 946 by controlling the operation of a row addressing circuit 934 and row drivers 940. Signals stored in the selected row of pixels are provided to a readout circuit 942. The signals are read from each of the columns of the array sequentially or in parallel using a column addressing circuit 944. The pixel signals, which include a pixel reset signal Vrst and image pixel signal Vsig, are provided as outputs of the readout circuit 942, and are typically subtracted in a differential amplifier 960 and the result digitized by an analog to digital converter 964 to provide a digital pixel signal. The digital pixel signals represent an image captured by pixel array 946 and are processed in an image processing circuit 968 to provide an output image.

Figure 10:
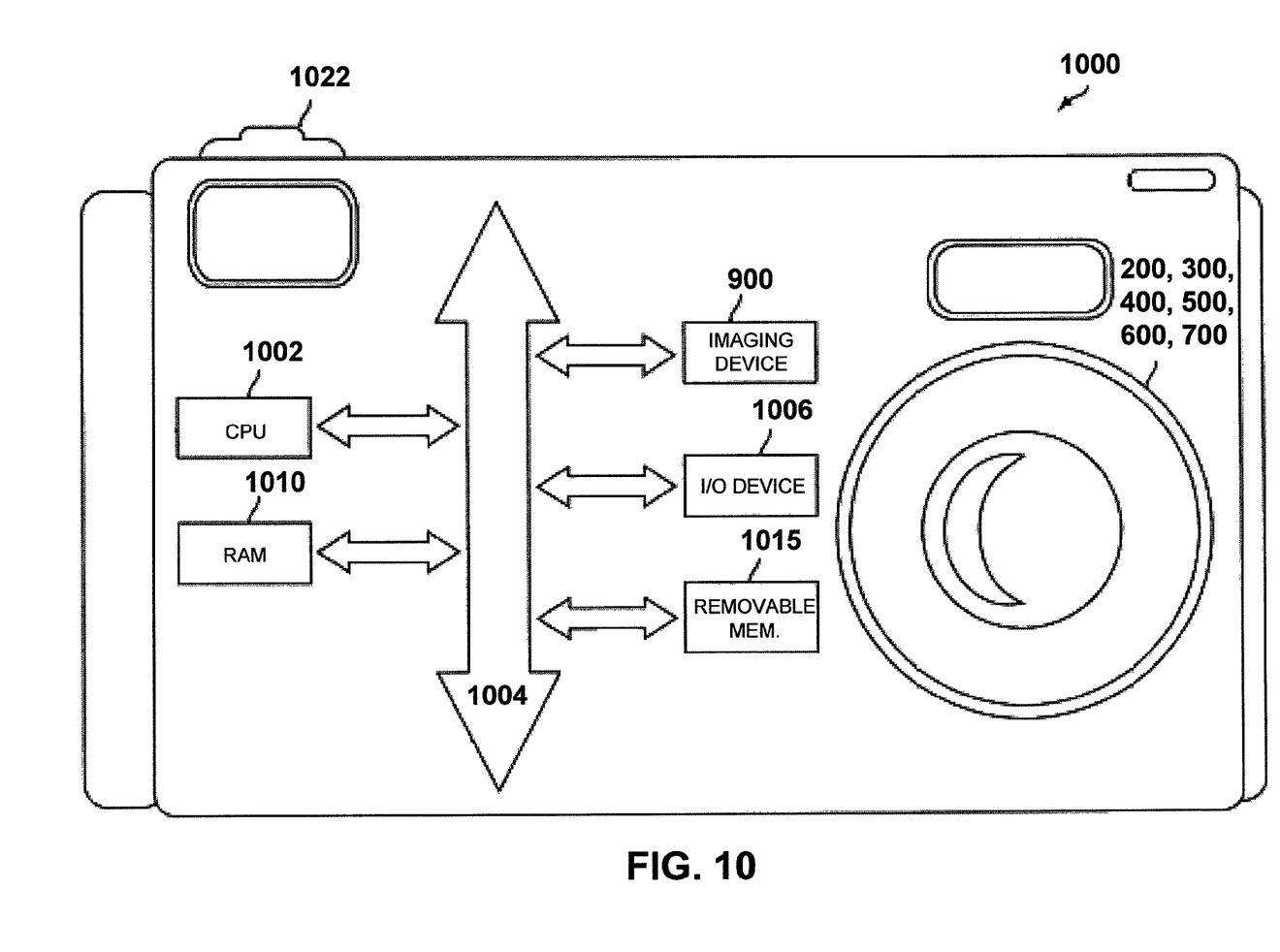
FIG. 10 depicts an imaging system constructed in accordance with an embodiment described herein.

FIG. 10 shows a system 1000 that includes an imaging device 900 and one of lens structure 200, 300, 400, 500, 600, 700 constructed and operated in accordance with the various embodiments described above. The system 1000 is a system having digital circuits that include imaging device 900. Without being limiting, such a system could include a computer system, camera system, e.g., a camera system incorporated into an electronic device, such as a cell phone, scanner, machine vision, vehicle navigation, video phone, surveillance system, auto focus system, star tracker system, motion detection system, image stabilization system, or other image acquisition system.

System 1000, e.g., a digital still or video camera system, generally comprises a central processing unit (CPU) 1002, such as a control circuit or microprocessor for conducting camera functions, that communicates with one or more input/output (I/O) devices 1006 over a bus 1004. Imaging device 900 also communicates with the CPU 1002 over the bus 1004. The processor system 1000 also includes random access memory (RAM) 1010, and can include removable memory 1015, such as flash memory, which also communicates with the CPU 1002 over the bus 1004. The imaging device 900 may be combined with the CPU processor with or without memory storage on a single integrated circuit or on a different chip than the CPU processor. In a camera system, a lens structure 200, 300, 400, 500, 600, 700 according to various embodiments described herein may be used to focus image light onto the pixel array 946 of the imaging device 900 and an image is captured when a shutter release button 1022 is pressed.

While embodiments have been described in detail in connection with the embodiments known at the time, it should be readily understood that the claimed invention is not limited to the disclosed embodiments. Rather, the embodiments can be modified to incorporate any number of variations, alterations, substitutions or equivalent arrangements not heretofore described. For example, while some embodiments are described in connection with a CMOS pixel imaging device, they can be practiced with any other type of imaging device (e.g., CCD, etc.) employing a pixel array.

The invention claimed is:

1. A focusing lens structure, comprising:
    a first lens arranged on a first side of a first substrate;
    a second lens arranged on a first side of a second substrate;
    a third lens arranged on a second side of the first substrate and between the second side of the first substrate and a second side of the second substrate; and
    a transparent material joining the second side of the first substrate and the third lens to the second side of the second substrate,
    wherein the transparent material has a dispersion that is different from a dispersion of the third lens.

2. The focusing lens structure of claim 1, wherein the first lens comprises a convex side facing away from the first side of the first substrate and wherein the second lens comprises a convex side facing away from the first side of the second substrate.

3. The focusing lens structure of claim 1, wherein the third lens comprises a convex side facing towards the second side of the second substrate.

4. The focusing lens structure of claim 1, wherein the third lens comprises a concave lens facing towards the second side of the second substrate.

5. The focusing lens structure of claim 1, wherein the third lens is integral with the second side of the first substrate.

6. The focusing lens structure of claim 1, wherein the third lens comprises one of a diffractive lens or a Fresnel lens.

7. The focusing lens structure of claim 1, wherein at least one of the first lens, the second lens, and the third lens is aspherical in shape.

8. The focusing lens structure of claim 1, wherein the transparent material comprises a curable polymer material.

9. The focusing lens structure of claim 1, wherein the transparent material has a higher dispersion than that of the third lens.

10. The focusing lens structure of claim 1, wherein the first lens, the second lens, and the third lens comprise an ultraviolet light curable polymer.

11. The focusing lens structure of claim 1, wherein the transparent material comprises an ultraviolet light curable polymer.

12. An imaging device employing the focusing lens structure of claim 1.

13. An imaging system employing the imaging device of claim 12.

14. The focusing lens structure of claim 1, further comprising a fourth lens arranged on the second side of the second substrate.

15. The focusing lens structure of claim 14, wherein the third lens comprises a convex side facing towards the second side of the second substrate and the fourth lens comprises a convex side facing towards the second side of the first substrate.

16. The focusing lens structure of claim 14, wherein the third lens comprises a convex side facing towards the second side of the second substrate and the fourth lens comprises a concave side facing towards the second side of the first substrate.

17. The focusing lens structure of claim 14, wherein at least one of the first lens, the second lens, the third lens and the fourth lens is aspherical in shape.

18. The focusing lens structure of claim 14, wherein the transparent material has a dispersion that is higher than that of the third lens and the fourth lens.

19. The focusing lens structure of claim 14, wherein the third lens comprises a concave side facing towards the second side of the second substrate and the fourth lens comprises a concave side facing towards the second side of the first substrate.

20. The focusing lens structure of claim 19, wherein the transparent material has a dispersion that is lower than that of the third lens and the fourth lens.

21. A focusing lens structure, comprising:
    a first substrate having a first side and a second side;
    a second substrate having a first side and a second side, wherein the second substrate is arranged substantially parallel to the first substrate and the second side of the first substrate faces the second side of the second substrate;

a first lens arranged on the first side of the first substrate and comprising a convex side facing away from the first side of the first substrate;

a second lens arranged on the first side of the second substrate and comprising a convex side facing away from the first side of the second substrate;

a third lens arranged on the second side of the first substrate and having a curved side facing towards the second side of the second substrate; and a transparent polymer material arranged between the first substrate and the second substrate and joining the second side of the first substrate and the curved side of the third lens to the second side of the second substrate, wherein the transparent material has an Abbe number that is different from an Abbe number of the third lens.

22. The focusing lens structure of claim 21, further comprising a fourth lens arranged on the second side of the second substrate and having a curved side facing towards the second side of the first substrate.

23. The focusing lens structure of claim 21, wherein the third lens comprises one of a diffractive lens or a Fresnel lens.

24. The focusing lens structure of claim 21, wherein at least one of the first lens, the second lens, and the third lens is spherical in shape.

25. An imaging module, comprising:

a pixel array comprising a plurality of pixel cells; and a focusing lens structure for focusing an image onto the pixel array, the focusing lens structure comprising:

a first lens arranged on a first side of a first substrate;

a second lens arranged on a first side of a second substrate;

a third lens arranged between a second side of the first substrate and a second side of the second substrate; and a transparent material joining the second side of the first substrate to the second side of the second substrate, wherein the transparent material has a dispersion that is different from a dispersion of the third lens, and wherein the focusing lens structure corrects a chromatic aberration of an image transmitted to the pixel array.

26. The imaging module of claim 25, wherein the focusing lens structure also corrects a spherical aberration of an image transmitted to the pixel array.

27. The imaging module of claim 25, wherein the first lens, the second lens, and the third lens are spherical lenses.

28. A method of forming a lens structure, comprising:

forming a first lens on a first side of a first substrate;

forming a second lens on a first side of a second substrate;

forming a third lens on second side of the first substrate; and joining the second side of the first substrate to a second side of the second substrate using a transparent material, wherein the transparent material has a dispersion that is different from a dispersion of the third lens.

29. The method of claim 28, further comprising forming a fourth lens on the second side of the second substrate.

30. The method of claim 28, wherein the transparent material is a curable polymer.

31. The method of claim 28, wherein the first lens, the second lens, and the third lens comprise an ultra-violet curable material and are formed using an ultraviolet light replication method.

32. The method of claim 28, wherein the second side of the first substrate is joined to the second side of the second substrate by curing the transparent material.

33. A method of forming an imaging module, comprising:

forming an imaging wafer comprising:

a plurality of first lenses arranged on a first side of a first substrate, a plurality of second lenses arranged on a first side of a second substrate, a plurality of third lenses arranged between a second side of the first substrate and a second side of the second substrate, and a transparent material joining the second side of the first substrate to the second side of the second substrate, wherein the transparent material has a dispersion that is different from a dispersion of the third lens;

dividing the imaging wafer into individual lens structures; and coupling the lens structures to an imaging wafer comprising a pixel array to form an imaging module.

34. The method of claim 33, wherein the lens structures are coupled to an imaging wafer prior to dividing the imaging wafer.

35. The method of claim 33, wherein the third lens is arranged on the second side of the first substrate and wherein the lens structure further comprises a fourth lens arranged on the second side of the second substrate.

* * * * *